(12) United States Patent (10) Patent No.: US 8,359,265 B2
Van Rensburg et al. (45) Date of Patent: Jan. 22, 2013

(54) BANKING SYSTEM WITH ENHANCED IDENTIFICATION OF FINANCIAL ACCOUNTS

(76) Inventors: Johannes Janse Van Rensburg, Welgemoed (ZA); Craig Sheldon Saks, Durbanville (ZA); Anthony Ian Willis, Centurion (ZA)

( * ) Notice: Subject to any disclaimer, the term of this patent is extended or adjusted under 35 U.S.C. 154(b) by 726 days.

(21) Appl. No.: 12/318,428

(22) Filed: Dec. 29, 2008

(65) Prior Publication Data

US 2009/0234772 A1 Sep. 17, 2009

Related U.S. Application Data

(63) Continuation of application No. 10/181,928, filed as application No. PCT/IB01/00100 on Jan. 29, 2001, now abandoned.

(30) Foreign Application Priority Data

Jan. 28, 2000 (ZA) .................................. 2000/0385
Mar. 3, 2000 (ZA) .................................. 2000/1095

(51) Int. Cl.
*G06Q 40/00* (2012.01)
(52) U.S. Cl. ......................................................... 705/39
(58) Field of Classification Search ...................... 705/39
See application file for complete search history.

(56) References Cited

U.S. PATENT DOCUMENTS 4,325,117 A * 4/1982 Parmet et al. .................. 715/210
5,220,501 A 6/1993 Lawlor et al. .................... 705/40
6,223,983 B1 * 5/2001 Kjonaas et al. ................ 235/379
7,814,018 B1 * 10/2010 Sosa et al. ........................ 705/43
2001/0011248 A1 * 8/2001 Himmel et al. .................. 705/39
2001/0056402 A1 * 12/2001 Ahuja et al. ..................... 705/43

FOREIGN PATENT DOCUMENTS

WO WO98/42173 10/1998
WO WO99/33034 7/1999

OTHER PUBLICATIONS

Google Search: "define: routing number".

* cited by examiner

*Primary Examiner* — Eric T Wong
(74) *Attorney, Agent, or Firm* — Kilpatrick Townsend & Stockton, LLP

(57) ABSTRACT

A computer based banking system is provided in which at least selected clients termed participating system members have access to a remote device adapted to communicate with the computer base banking system such that financial transactions can be conducted by remote operation of the remote device by the participating system member to result in the debiting of a financial data base record associated with an instructing participating system member and in the crediting of a different financial data base record. Each data base record is identified by a conventional account number generated to conform to banking numbering standards as well as a linked communication number different from the relevant bank account number and composed of at least two component strings of numbers and/or letters, one of which is a number regionally unique to the participating system member, and the other of which is a bank identifying number unique to the particular bank at least on a regional basis. The communication number preferably also includes the two digit international dialing code; the telecommunications area code or the mobile operator code; and a check digit.

7 Claims, 2 Drawing Sheets

BANKING SYSTEM WITH ENHANCED IDENTIFICATION OF FINANCIAL ACCOUNTS

This application is a Continuation Application of U.S. patent application Ser. No. 10/181,928 filed Jul. 29, 2002, which is a National Stage Application of PCT/IB01/00100, filed Jan. 29, 2001 and published in English, which claims priority to both ZA 2000/0385 filed Jan. 28, 2000 and ZA 2000/1095 filed Mar. 3, 2000, which are incorporated by reference herein.

FIELD OF THE INVENTION

This invention relates to a banking system with enhanced identification of financial accounts employed for the purpose of conducting commercial transactions and, more particularly, to a banking system which includes a provision for the transfer of funds or other redeemable value from one account to another account at the instance of a person or agency other than the financial institution in whose computer system the account is being administered.

Still more particularly, the invention relates to a banking system in which an account holder has the facility for transferring funds from a particular account over which he or she has control to another account by operation of a remote device, usually a wireless mobile device, with such transactions optionally being carried out in parallel with other financial transactions involving the same account with clearing possibly, but not essentially, being effected in real time insofar as the transactions carried out at the instance of the client are concerned.

BACKGROUND TO THE INVENTION

There are a number of different proposals which have been put forward in an attempt to obviate the disadvantages of the use of hard cash in day to day financial transactions or periodic transactions such as the payment of monthly expenses and the like. These disadvantages are clearly the danger of either losing hard cash or being defrauded, or simply robbed of it. Many of the proposals have involved the use of electronic wallets such as smart cards in which electronic cash is loaded and which are unloaded as the electronic cash is spent by transferring the electronic cash held in the electronic memory of the wallet to a recipient's device such as another smart card in which an electronic memory is present. Whilst these arrangements do have certain advantages over the use of hard cash the electronic wallets themselves are always susceptible to theft or being lost and also need to be re-loaded from time to time.

As a consequence, other proposals have been put forward which involve the direct debiting and crediting of a client's bank account (as broadly defined herein) at the instance of the client himself and from a remote location. These arrangements are becoming more appealing as they obviate the obvious dangers of any type of physical entity serving the purpose of an electronic wallet.

One form of device that has been proposed as a device for effecting remote transfer of funds from one account to another is a mobile wireless device, more particularly mobile telephone, and especially a cellular telephone.

Clearly, the bank account number of both the account to be debited and the account to be credited must be available for use whenever a transaction is to be carried out and, as a general rule, the conventional bank account numbers are complex numbers created to comply with banking numbering standards. Such numbers are thus generally rather difficult to remember. Of course, certain of the numbers may be retained in memory in the electronic device being used to effect such remote transfer of funds but there will be numerous occasions in which the number of one party will have to be conveyed to the other party.

Also, the more sophisticated systems which have been proposed do not wish to limit access to such banking facilities to the exclusive use of a single electronic device such as a mobile wireless device. Their aim is to provide greater flexibility so that, if the electronic device is stolen, malfunctions, or is simply not available, the client can still access the relevant bank account to conduct financial transactions by way of other communications devices such as a computer and modem; a land-line, a call centre or other device capable of communicating with the bank's computer system by way of wireless or hard-wired connections. However, in order to do so, the client must have the relevant bank account number available and the best method of ensuring that it is available at all times is to remember it. The problem is that the complicated numbers allocated to bank accounts in accordance with banking numbering standards are extremely difficult to remember.

OBJECT OF THE INVENTION

It is, accordingly, an object of the invention to provide a banking system for the identification of bank accounts which will render the remembering of complex bank allocated account numbers in terms of banking numbering standards unnecessary.

DEFINITIONS

In this specification it is to be understood that the following terms are to be accorded the meanings stated hereunder.

"Bank" means any financial institution carrying on the business of transferring funds held on behalf of, or loaned to, a customer and recorded in a computer data base record from that data base record to a computer data base record of another customer of that, or of another, bank whether or not the institution complies with the local or national requirements for trading under the name of a bank.

"Cleared", "clearance" or any other form of the word as applied to a transaction means that the relevant credit has become available for use by the recipient without restriction by the computerized server in which the relevant financial data base record is held.

"Conventional banking transactions" includes those carried out in respect of a current account and involving the use of cheques and/or ATM access and/or computer or land-line telephone banking access, a savings account, a credit or debit card account, or a transmission account.

"Electronic purse" includes "electronic wallets" and other equivalents and is intended to mean any electronic memory for retaining data which translates into a positive balance of redeemable value units, usually, but not necessarily, units of currency generally referred as electronic money or e-cash and which can generally be used as and when desired by or on behalf of the holder by a simple credit transfer off-line with respect to any bank or credit card institution.

"Financial data base record" is intended to mean any data base record including data as to an amount of money reflected in currency units or a record of a number of any other type of redeemable or consumable units having value.

"Irreversible" as applied to a transaction means that, absent criminal activity (including fraud) or processing error (whether hardware or software related) the transaction cannot be reversed other than at the instance of the recipient.

"Merchant" is intended to include all suppliers of goods and services of all types which may be participating system members as herein defined but irrespective of such membership have been allocated a financial data base record in a computerized server of the invention as defined below.

"Mobile device" means any device communicating by way of a wireless network operated by a service provider and including mobile telephones but which need not necessarily assume the form of a telephone.

"Participating system member" is intended to mean any subscriber of a wireless network forming a part of a system according to this invention as hereinafter defined and includes mobile telephone subscribers as well as users of prepaid cellular or mobile services who form part of such a system.

"Region", "regional", "regionally" or any other form of the word as applied to any entity including participating system members, merchants, vendors, service providers and banks is intended to mean a portion of a whole such as a country, a province, a clearly defined economic sector, a particular category, a particular acknowledged electronically defined domain or zone, a defined telecommunications area or provider, a pre-defined postal area or any other portion of a whole as may make logical sense in the context hereof and in practice.

"Settled", "settlement" or any other form of the word as applied to a transaction means the final transfer of money or other units of value as between financial institutions; between financial institutions and a central bank; between financial institutions and computerized servers according to this invention; or between different computerized servers according to this invention and which generally take place on a periodic basis (for example daily or weekly) and wherein set-off may or may not be employed to result in a single net transfer of money or units of value in respect of a plurality and often a large number of transactions.

"Sub-system" is intended to mean any modifications and/or additions made to the software and/or hardware of a conventional style of banking system for the purpose of enabling the transactions of this invention to be conducted in parallel with conventional banking transactions whether or not the software and hardware of the sub-system is separately identifiable from the banking system with which it may be intricately mixed.

"Vendor" is intended to include all suppliers of goods and services of all types which do not have a financial data base record as herein defined.

SUMMARY OF THE INVENTION

In accordance with this invention there is provided a computer based banking system including banking style of software and hardware providing a data base in which clients of a bank are each allocated a financial data base record in which data relating to transactions conducted by the relevant client is maintained together with any other data concerning the client which is considered by the bank or client to be necessary or appropriate with each data base record being identified by an account number generated to conform to banking numbering standards and wherein the banking style of software includes program material enabling at least some of the bank's clients to function as participating system members (as herein defined) with each participating system member having a remote device adapted to communicate with the computer based banking system such that financial transactions can be conducted by remote operation of the remote device of a participating system member to result in the debiting of a financial data base record associated with an instructing participating system member and in the crediting of a different financial data base record associated with any one of self, another participating system member and a merchant, the system being characterized in that a communication number different from the relevant bank account number is linked to the data base record so that the communication number may be embodied in communications from the remote device in order to carry out transactions in the relevant data base record of the account, the communication number being composed of at least two component strings of numbers and/or letters, one of which is a number regionally unique to the participating system member, and the other of which is a bank identifying number unique to the particular bank at least on a regional basis.

Further features of the invention provide for the banking style of software and hardware to enable the conduct of conventional banking transactions wherein the system includes software and any necessary hardware to provide a sub-system in which said transactions can be conducted using a remote device; for the remote device to be a mobile wireless device such as a mobile telephone, in particular a cellular telephone; for the number regionally unique to the participating system member to be the member's telephone number such as a cellular telephone number, all or part of a national or regional identity number, or a pager or an e-mail or other similar unique address or identifier; for the communication number to include a third string of numbers and/or letters being the mobile operator or telecommunications area code and also optionally a fourth string being the relevant country's international dialing code; and for the communication number to include a check digit such as Luhn check digit.

It will be understood that a communication number including all four strings of numbers and/or letters will generally be inherently unique globally.

The bank identifying number may be a part of, or the whole of, the commonplace six or eight digit bank identification number (BIN) or institution identification number (IIN) in wide use. However, in the preferred form of the invention in which the communication number includes both a country code and a telecommunications area or mobile operator code it is considered that a two or three digit bank identifying number unrelated to the BIN or IIN will be used and will be adequate as the region will be relatively closely restricted by the country and telecommunications area or operator code. It is also to be noted that where a bank has more than one official BIN or IIN the bank identifying number indicated above may identify a particular BIN or IIN.

The bank account number complying with banking numbering standards will generally consist of a six to eight digit BIN number followed by an account number and a check digit. These numbers are totally meaningless to most people and are thus extremely difficult to remember. Inputting such a number or conveying it to another party to enable them to effect a transaction as and when required would be troublesome to say the least.

A communication number as provided by the invention, on the other hand would require minimal effort to remember. The preferred communication number would conveniently commence with the two digit international dialing code followed by the two, three, or four digit national area code or national mobile operator code and thereafter the subscriber mobile telephone number or the subscriber's national identity number, or a part thereof. This is followed by a two or three digit bank identifying number which in turn is followed by a final check digit. The only new part which really needs to be remembered by a client is the bank identifying number and the check digit.

The computerized server will simply link the account number to the communication number so that the correct account is accessed each time the communication number is employed.

In order that the invention may be more fully understood, a banking system embodying the inventive features of the invention will now be described with reference to the accompanying drawings.

DETAILED DESCRIPTION WITH REFERENCE TO THE DRAWINGS

Figure 1:
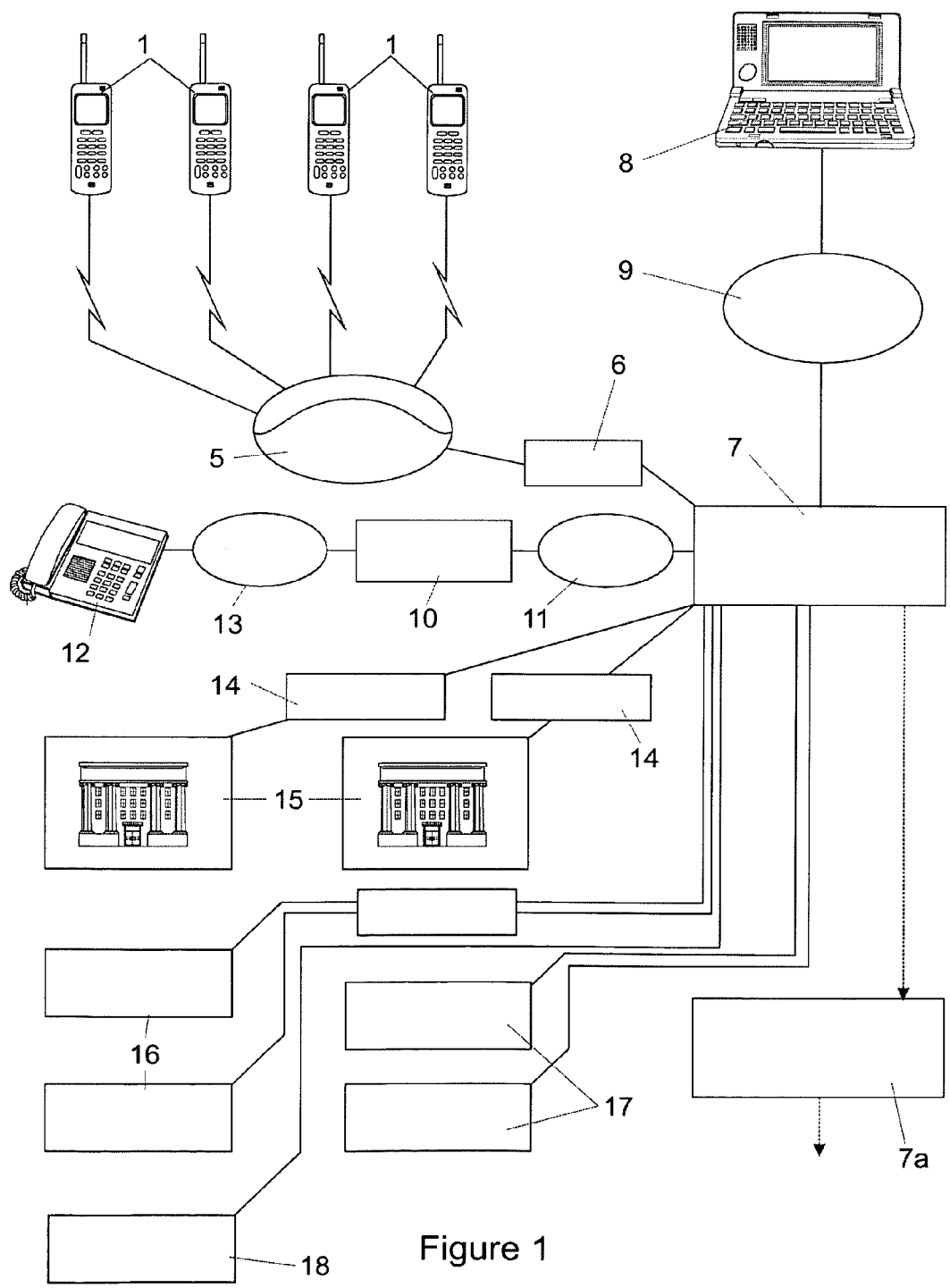
FIG. 1 is a schematic diagram of a system according to the invention.

In this embodiment of the invention a conventional computer based banking system (100) includes conventional banking systems generally including the usual current account system (101) and ATM system (102). The detailed operation of such systems is well known in the art and will not be described further herein.

That system is added to in order to provide a sub-system operating in parallel with the conventional banking systems as follows.

Simply by way of example the instant embodiment of the invention is described as being applied to a sub-system to be accessed using, in amongst other devices, cellular telephones in which a microprocessor and memory are embodied in a telephone, often in a SIM card removably held in each of the relevant cellular telephones. However it will be quite apparent to those skilled in the art that the system can just as easily use any other type of cellular or mobile telephone or other suitable wireless or other remote device and associated network and that the term cellular telephone can be replaced by such other suitable device in what follows. Also a single system will generally involve the use of a plurality of different wireless and other remote communications devices as will be apparent from a reading of this specification although for simplicity of description cellular telephones will be used to exemplify a banking system utilizing the invention.

The sub-system for conducting commercial transactions enables any number of the bank's clients to become participating system members (as herein defined) each of which has, in this case, a cellular telephone (1) embodying a SIM card (2) or having alternative memory specially selected to be adequate for the purposes of implementing the invention as described below. The cellular telephones (SIM cards in this instance) are each pre-programmed with conventional applications and data as indicated by numeral (3) (see FIG. 2) as well as with additional applications and additional data necessary for the implementation of a sub-system according to the invention as indicated by numeral (4) in FIG. 2 so as to enable the cellular telephone to be used as a remote device whereby commercial transactions can be carried out as will be more apparent from the following.

It is to be noted that the participating system members need not all belong to the same network and that a plurality of networks can be involved without in any way adversely affecting the operation of the system of the invention.

The conventional programs and data include data embodying the cellular telephone number; the conventional access PIN number; any other security number or other personal identifier such as one using a biometric characteristic; and the conventional menu and data relating to stored telephone numbers, addresses, short messages etc. to be used, processed or transmitted as required.

The additional program applications and menu structures enable commercial transactions to be carried out employing an additional PIN number or personal identifier, such as a biometric identifier. The menu items may provide access to a variety of different financial and other transactions selectively. The additional applications may also include a program providing the ability to update menu items remotely by way of distributed messages originating from the sub-system (see below) and containing updated menu data and also to change the settings in a particular cellular telephone.

Figure 2:
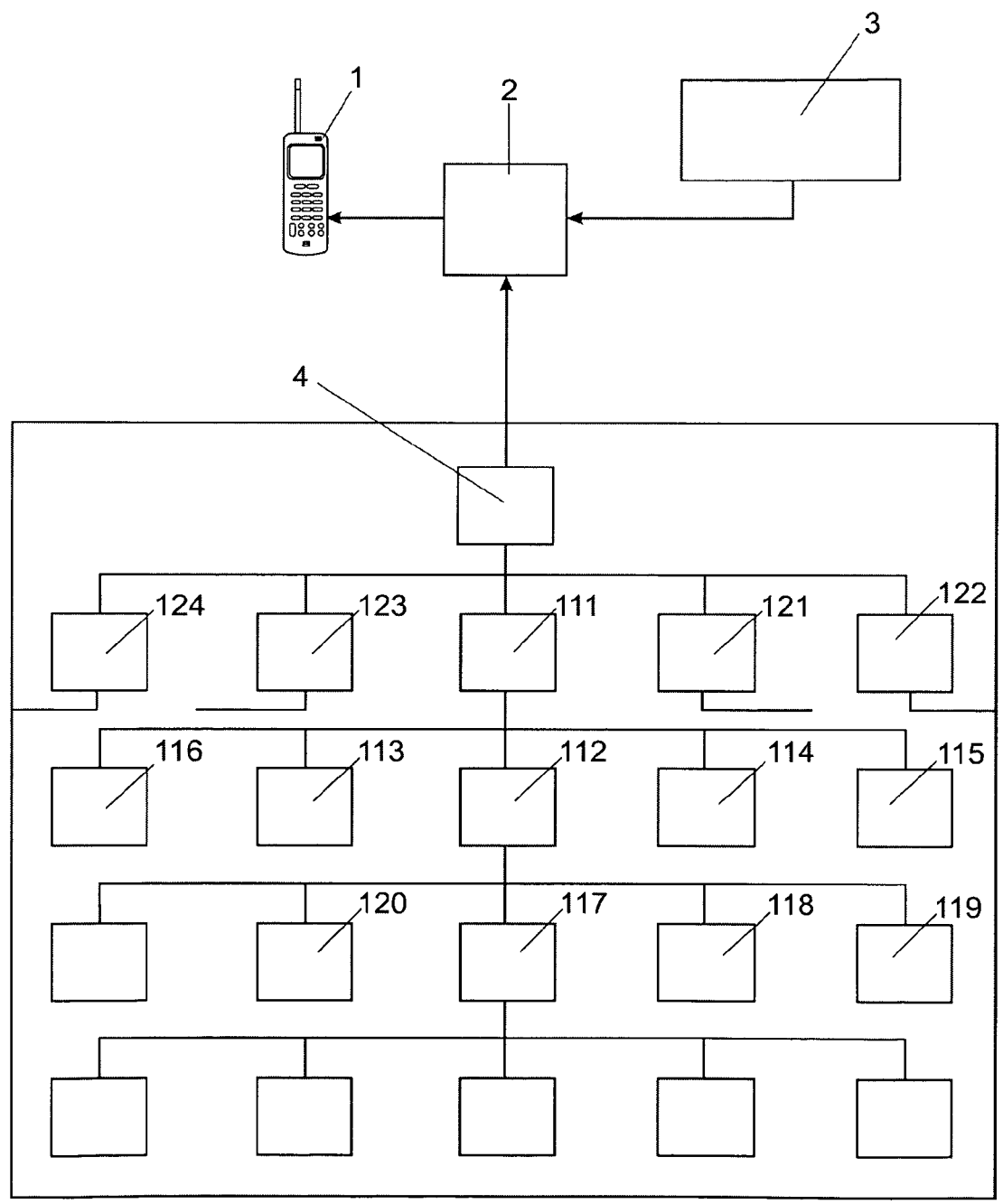
FIG. 2 is a block diagram of a cellular telephone forming part of the system illustrated in FIG. 1.

Each additional menu item has associated with it a preset standard message which is a substantially complete instruction only requiring a small amount of data in order to complete it, for example, the identity of the recipient; the amount to be transferred; and the additional PIN or other security input. The identity of the recipient may even be selected from a sub-menu in which there may be a custom list of potential recipients. The additional data may include account details relating to selected other institutions of a banking, retail, or service nature; selected merchants; selected vendors; associated broadcast or information services; and other remote similar banking systems or stand alone computerized servers in other geographic areas or countries. An example of the general arrangement of a part of an additional menu structure of the cellular telephone is illustrated in FIG. 2.

The basic and most important additional menu item (111), namely financial transactions, may be divided, in the first place, into local (112); international (113); query (114) and authorization request (115) activities. Provision for additional items (116) may also be made. At the next level down, for example, local transactions (112) can be divided into transactions between participating system members (117); transactions with merchants (118) (who do not necessarily have a cellular telephone as such but by definition have a financial data base record); and transactions between a participating system member and a participating banking institution (119). Also it may be convenient to provide as a separate menu item transactions between own accounts (120).

The extent to which the additional menu items and data are carried by the cellular telephone itself will depend largely on the capacity of the memory (in the instant case the SIM card) in the mobile device and the associated microprocessor. Thus, in its most comprehensive form, as far as the cellular telephone is concerned, all of the applications and data occasioned by the additional menu structures will be resident in the memory of the cellular telephone. In other cases a lesser portion of those applications and data may be present but in any event whatever is necessary to achieve the objectives set out below. The smallest amount will inevitably be cases in which the cellular telephone has a browser for accessing the necessary applications and data which may then be maintained on the server, for example.

The cellular telephone is programmed to communicate by way of suitable interpretive software (6) with the sub-system (7) of the banking system, the communication being by way of the associated cellular network (5).

The sub-system (7) is programmed to accept instructions not only from the cellular telephones but also from a computer, for example a laptop computer (8); via the Internet as indicated by numeral (9) as well as from call centres indicated by numeral (10); or even by way of intra-net as indicated by numeral (11). Participating system members can thus, as an alternative, carry out transactions from a remote telephone (12) and land line (13), by calling in to the call centre or by way of a computer via the Internet.

Finally, the computer based banking system is also linked to other banking systems (100a) having similar sub-systems (7a) and to similar stand alone computerized servers (7b) and which may be located in different geographic areas or in different countries and each of which has its own set of participating system members and merchants.

The computer based banking system in this embodiment of the invention provides a financial data base record for each client and thus for each participating system member and merchant.

Each data base record will be identified by its conventional bank account number generated to comply with banking numbering standards. However, each data base record of a participating system member may, as provided by this invention, also be accessed using a communication number which includes, as at least a part of it, in this embodiment, the cellular telephone number. In such a case the bank's computer is programmed to associate the communication number with the official bank account number. Preferably the communication number is structured on an international level.

The communication number could thus be structured as a two digit international dialing code followed by a two, three, or four digit national area code or national mobile operator code and thereafter the subscriber mobile telephone number. This may be followed by a two or three digit bank identifying number (which will generally bear no resemblance to the BIN or IIN number) which in turn is followed by a final check digit. The only new information which really needs to be remembered by a client is the bank or server identifying number and the check digit.

As an example, a communication number could be +27823918711015.

This is composed of the following component strings:
+ is a sign to introduce the communication number;
27 is the international country dialing code;
82 is the mobile operator code;
3918711 is the subscriber identifier (telephone) number which should be well known to the subscriber/client;
01 is the bank or institution identifying number (within the mobile operator's subscriber list within the particular country and therefore with two digits allowing for up to 100 different participating); and,
5 is the check digit. The check digit can be generated by any chosen algorithm such as, for example, the Luhn algorithm.

Thus, in this case all that a client has to remember afresh is the two digit bank identifying number and the check digit.

The length of each of these strings can obviously be altered according to requirements. In particular, the institution identifying number may be, say, three digits long to allow for 1000 institutions.

Clearly, the number of digits allocated to each part of the composite communication number described above can be varied according to particular circumstances.

Each data base record also includes data embodying the additional PIN number, and any additional security number or data which may be employed.

The programming of the sub-system enables the functions of receiving and sending out of data in the form of messages; a facility for encrypting and decrypting data at least with regard to financial transactions; and the ability to link up with vendors; broadcast services; other third party services and other similar banking systems (100a) having similar sub-systems (7a) and to similar stand alone computerized servers (7b).

Most importantly the program associated with the sub-system enables financial transactions to be carried out from a participating system member as the instructing participating system member to another participating system member merchant or vendor by remote operation of the cellular telephone or any of the other devices mentioned above.

Implementation of an application and menu structure of the type described above with pre-set standard messages, enables data pertaining to a transaction to be captured rapidly and a composite message, including the additional PIN (almost invariably encrypted) if it be required by the server, to be formulated on the cellular telephone prior to connection with the sub-system where the size of memory is adequate to permit this. This results from the fact that a substantial part, if not an entire duplicate, of the necessary parts of the program or application as well as the menu data are resident in the memory of the cellular telephone itself so that certain activities can be carried out independently of the server. This facility will be limited if inadequate memory is available in the cellular telephone. In any event, included in the message is the communication number, whether this be inputted by the participating system member or extracted from memory.

It must, therefore, be noted that the menu facility is not essential and could be replaced by another expedient such as a browser programmed into the cellular telephone for use in accessing the necessary facilities to conduct transactions, for example by way of the Internet. WAP phones could be used to particular advantage in this instance.

As a general rule the program is adapted to enable, by way of the sub-system, the debiting from a relevant data base record which has an adequate positive balance (or specially arranged credit facilities) to another data base record. The system can operate in two basically different ways, namely in respect of a transaction initiated by the recipient being the creditor or in respect of a transaction initiated by the participating system member being the debtor. In instances in which the recipient or creditor initiates the transaction it will be necessary for the communication number to be transferred to such person. In that case the communication number of the data base record to be debited must be conveyed to the creditor. In the event that the transaction is initiated by the debtor, being a participating system member, then the communication number of the data base record of the recipient or creditor will need to be conveyed to the participating system member if he does not already had as a standard menu item, for example.

In either case the person initiating the transaction will select a desired transaction in respect of an inputted amount, will enter, if not automatically recalled the communication number; and request the transaction to be effected. In the case of the participating system member he will also enter the additional PIN or carry out any other appropriate security activity, and will then communicate with the sub-system. In the case of the creditor initiating the transaction the computerized server will generally communicate with the participating system member requesting authorization to effect the transaction.

The computerized server will identify the relevant bank account number from the communication number; will check that the PIN or other security signal is in order; will check that the necessary funds or credit facility is available; will check the validity of the identity of the selected recipient; and the program will then effect the transfer of the relevant funds from the data base record of the participating system member to the data base record of a recipient who will usually be a different participating system member or a merchant, a vendor or any other person or institution as indicated above.

Once the transaction has been completed the sub-system may be programmed to send a confirmatory message to both parties advising them of the completion of the transaction.

It will be understood that the activity described above may be carried out using the communication number to communicate a transaction to the data base record in parallel with the usual activities of running the conventional bank account involving a current account and any ATM account using the conventional bank account number.

The system described herein has the advantage that the loss of a cellular telephone for whatever reason does not seriously prejudice a participating system member in the same way as loss of a smart card in the prior art system. In the system of this invention a participating system member who loses his cellular telephone can still conduct transactions by way of the Internet or by way of a call centre set up for the purpose using the communication number to identify the bank account. The call centre also enables persons to use the system who do not have a cellular telephone and similarly computer owners who have access to the Internet can use the system without possessing a cellular telephone in which case the communication may rather embody some other regionally unique number such as the client's national identity number, for example. All that the client will need to have available (conveniently by memory) is the communication number.

There are numerous other ways in which the invention can be implemented and numerous other possible ways in which the communication number can be derived so long as at least the said two components or strings of the number are regionally unique.

The invention claimed is:

1. A computer-based banking system comprising:
a computer processor configured to:
provide a database in which clients of a bank are each allocated a financial database record in which data relating to banking transactions conducted by a client is maintained together with other data concerning the client, wherein each database record is identified by a bank account number generated to conform to banking numbering standards, wherein each database record is also identified by a communication number different from the bank account number, wherein the communication number comprises (a) a two, three, or four digit national area code or national mobile operator code followed by (b) a subscriber mobile telephone number or the subscriber's national identity number, or a part thereof followed by (c) a two or three digit bank identifying number followed by (d) a check digit;
enable at least some of the bank's clients to function as participating system members with each participating system member having access to a mobile wireless device adapted to communicate with the computer-based banking system;
receive the communication number from an instructing participating system member via the mobile wireless device;
identify, using the communication number, a relevant database record within the bank's database without reference to the bank account number; and
debit the relevant database record associated with the instructing participating system member and credit a different financial database record associated with any one of: a) the instructing participating system member; b) another participating system member that may be a client of the same or a different bank; or c) a merchant.

2. The computer-based banking system of claim 1, wherein the computer processor is further configured to: provide a sub-system in which said transactions are conducted using the remote device.

3. The computer-based banking system of claim 1, wherein the mobile wireless device is a mobile telephone.

4. The computer-based banking system of claim 1, wherein the communication number further comprises a two-digit international dialing code.

5. A method comprising:
receiving from a subscriber, via a computing device, information regarding a selected recipient and a communication number, wherein the communication number comprises (a) a two, three, or four digit national area code or national mobile operator code followed by (b) a subscriber mobile telephone number or the subscriber's national identity number, or a part thereof followed by (c) a two or three digit bank identifying number followed by (d) a check digit;
identifying, via the computing device, a bank account number using the communication number, wherein the bank account number is linked to a database record; and
transferring funds, via the computing device, from the database record to a recipient database record using the identified bank account number.

6. The method of claim 5, further comprising receiving a PIN from the subscriber in addition to the communication number.

7. The method of claim 5, further comprising sending, via the computing device, confirmation messages to the recipient and to the subscriber.

* * * * *